(12) United States Patent
Ley et al.

(10) Patent No.: US 8,754,560 B2
(45) Date of Patent: Jun. 17, 2014

(54) ROTOR FOR A PERMANENT MAGNET ELECTRIC MACHINE

(75) Inventors: Josh Ley, Erie, CO (US); Stanley Allan Betzold, Longmont, CO (US); Victor Chieduko, Arvada, CO (US)

(73) Assignee: UQM Technologies, Inc., Frederick, CO (US)

( * ) Notice: Subject to any disclaimer, the term of this patent is extended or adjusted under 35 U.S.C. 154(b) by 279 days.

(21) Appl. No.: 12/626,286

(22) Filed: Nov. 25, 2009

(65) Prior Publication Data
US 2011/0121677 A1 May 26, 2011

(51) Int. Cl.
*H02K 21/12* (2006.01)

(52) U.S. Cl.
USPC ..... 310/156.53; 29/596; 29/598; 310/156.01; 310/156.56; 310/156.11

(58) Field of Classification Search
USPC ............ 310/156.01, 156.11, 156.23, 156.39, 310/156.38, 156.53, 156.56, 156.57
See application file for complete search history.

(56) References Cited

U.S. PATENT DOCUMENTS

| | | | | |
|---|---|---|---|---|
| 5,684,352 A | * | 11/1997 | Mita et al. | 310/156.56 |
| 5,864,191 A | * | 1/1999 | Nagate et al. | 310/156.54 |
| 6,906,444 B2 | * | 6/2005 | Hattori et al. | 310/156.53 |
| 7,598,645 B2 | * | 10/2009 | Ley et al. | 310/156.38 |
| 2004/0212256 A1 | * | 10/2004 | Sugishima et al. | 310/44 |
| 2006/0112533 A1 | * | 6/2006 | Kuo | 29/446 |
| 2006/0273683 A1 | * | 12/2006 | Caprio et al. | 310/211 |
| 2007/0024249 A1 | * | 2/2007 | Dooley | 322/44 |
| 2008/0278021 A1 | * | 11/2008 | Ley et al. | 310/156.38 |
| 2008/0290753 A1 | * | 11/2008 | Arimitsu et al. | 310/156.36 |

* cited by examiner

*Primary Examiner* — Terrance Kenerly
(74) *Attorney, Agent, or Firm* — Buchanan Ingersoll & Rooney PC

(57) ABSTRACT

A rotor for a permanent magnet electric motor includes a rotor core having a generally cylindrical shape with an outer circumferential surface and a rotational axis and a plurality of magnet insertion hole arrangements formed in the rotor core and arranged circumferentially at a preset angular interval about the rotational axis. Each hole arrangement has a radially inward side, a radially outward side, and two ends that are respectively spaced apart from the circumferential surface by respective bridge regions formed by the rotor core. The material of the bridge regions is metallurgically transformed by having its grain structure changed, e.g., by heating the material to at least its Curie temperature, whereby the material possesses greater magnetic reluctance than the material of adjacent portions of the rotor core.

23 Claims, 5 Drawing Sheets

(PRIOR ART)

ROTOR FOR A PERMANENT MAGNET ELECTRIC MACHINE

FIELD OF THE INVENTION

This disclosure relates to a permanent magnet electrical machine, such as a motor or generator, more specifically, to the field of interior permanent magnet (IPM) electric motors and the rotors for such machines.

The drive for energy efficiency and low cost motors in recent years has led to development of many types of electric motors and generators for various applications. Among the electric motor types, permanent magnet synchronous motors (PMSM) are known to have high power density and efficiency. One of the more prevalent types is often referred to as an interior permanent magnet (IPM) motor, which is a specific type of PMSM. It is also known as a permanent magnet reluctance (PMR) motor because of its hybrid ability to produce reluctance torque as well as permanent magnet torque. A PMR motor, which includes a rotor having one or more permanent magnets embedded therein, generates a higher torque than a motor with magnets mounted on the surface of the rotor. This embedded structure produces an additional reluctance torque due to the permanent magnets positioned in the rotor core in such a way as to provide a variable reluctance magnetic circuit in the rotor core, also known as saliency.

During operation, each magnet embedded in the rotor core is subject to centrifugal force. In order to retain the magnets within the rotor core under the centrifugal force, narrow sections of rotor core material, called "bridges" or bridge regions, are often retained between the ends of a magnet pole and the outer periphery of the rotor core. The centrifugal force acting on the permanent magnets and the centrifugal force acting on the rotor core are concentrated in these bridges. For this reason, the radial widths of the bridges are made large enough to maintain the required mechanical strength. A difficulty in the conventional motor is that the bridge portions need to be made thick to meet the mechanical strength requirement at the expense of a higher flux leakage through the bridge portions that leads to a lower torque production. Conversely, thinner bridges lead to a reduction in rotor strength, thereby limiting the speed capability of the motor. This trade-off relationship between mechanical strength and magnetic flux leakage has limited the development of higher-speed, higher torque motors.

U.S. Pat. No. 6,906,444 discloses various types of rotors configured to address the trade-off issue. FIGS. 1 and 2 of the accompanying drawing are schematic transverse cross sectional diagrams of rotor cores described in the aforementioned patent. The prior art rotor core 11 in FIG. 1 includes a center pole section 15 having a plurality of poles, wherein each pole has three trapezoidal shaped magnet holes 12 and three permanent magnets, i.e., a center magnet 13a and two end-most magnets 13b, inserted in respective ones of the magnet insertion holes 12. The center pole section 15 forms bridges 16 disposed between the outer periphery of the center pole section 15 and the end-most magnets 13b. Between neighboring holes 12 there are disposed intermediate ribs 14 that prevent the centrifugal force acting on the permanent magnets 13 and center pole section 15 from being concentrated in the bridges 16, thereby enhancing the rotational speed limit without increasing the radial width of the bridges 16. However, the multiple magnet insertion holes 12 and ribs 14 increase magnetic flux leakage between neighboring poles and thus reduce torque production, i.e., a higher rotational speed may be obtained at the expense of torque reduction.

The prior art rotor core 21 shown in FIG. 1 includes U-shaped permanent magnet insertion holes 22 and permanent magnets 24 inserted in the holes. The rotor core 21 also includes an annular nonmagnetic ring 25 that covers the outer peripheral portion of the rotor core. The ring 25, which is formed of highly rigid nonmagnetic material, is used in place of the afore-mentioned bridges or in addition to the bridges. Because the annular nonmagnetic ring 25 is fitted over the outer peripheral portion of the rotor core 21, the structure is able to resist the breakage of the rotor due to the centrifugal force acting on the magnets 24 and center pole section 21 during operation. Also, the magnetic flux leakage from the center pole section 26 is reduced, thereby making it possible to obtain a high magnetic flux density in the center pole section 26. As the size of the permanent magnets 24 can be made large and the magnetic flux density produced in the center pole section 26 as well as the saliency in the rotor core 21 can increase, the overall torque can be increased. However, the disadvantage of incorporating the nonmagnetic ring 25 is that it significantly increases the manufacturing cost. Also, the gap between the rotor core 21 and stator (not shown) decreases and eddy current loss may increase if the ring 25 is metallic. Thus, there is a need for low cost electric machines having enhanced rotational speeds, power, and torque densities, without a ring such as shown in this prior art.

It would be desirable provide a permanent magnet electrical machine which is economical to produce and which reduces flux loss without weakening the rotor and without the use of intermediate ribs and annular rings.

SUMMARY

In one embodiment, a rotor for a permanent magnet electric machine includes: a rotor core having a generally cylindrical shape with an outer circumferential surface and a rotational axis; a plurality of magnet insertion hole arrangements formed in the rotor core and arranged circumferentially at a preset angular interval about the rotational axis, each hole arrangement extending in a direction parallel to the rotational axis and having a radially inward side, a radially outward side, and two ends that are respectively spaced apart from the circumferential surface by respective bridge regions formed by the rotor core, the material of the bridge regions being metallurgically transformed to possess greater magnetic reluctance than the material of adjacent portions of the rotor core.

Also disclosed is a method for making the rotor in which the metallurgical transforming of the bridge region material is performed by changing the grain structure of the material. A preferred technique for achieving that change is by heating the material to at least its Curie temperature, e.g., by laser heating.

DETAILED DESCRIPTION OF PREFERRED EMBODIMENTS

As explained in detail below, bridge regions of a permanent magnet rotor, which retain the permanent magnets against centrifugal force, are treated or manipulated so as to reduce their magnetic permeability, i.e., to increase their magnetic reluctance, whereby the magnetic permeability of the bridge regions is less than that of portions of the rotor core situated adjacent the bridge regions. That produces advantages including increasing the saliency of the rotor and the reluctance torque produced by the motor, minimizing flux leakage to the opposite magnet pole within the rotor core to allow more magnet flux to link the stator, and strengthening the bridge regions to allow the motor to operate at higher speeds.

Figure 3:
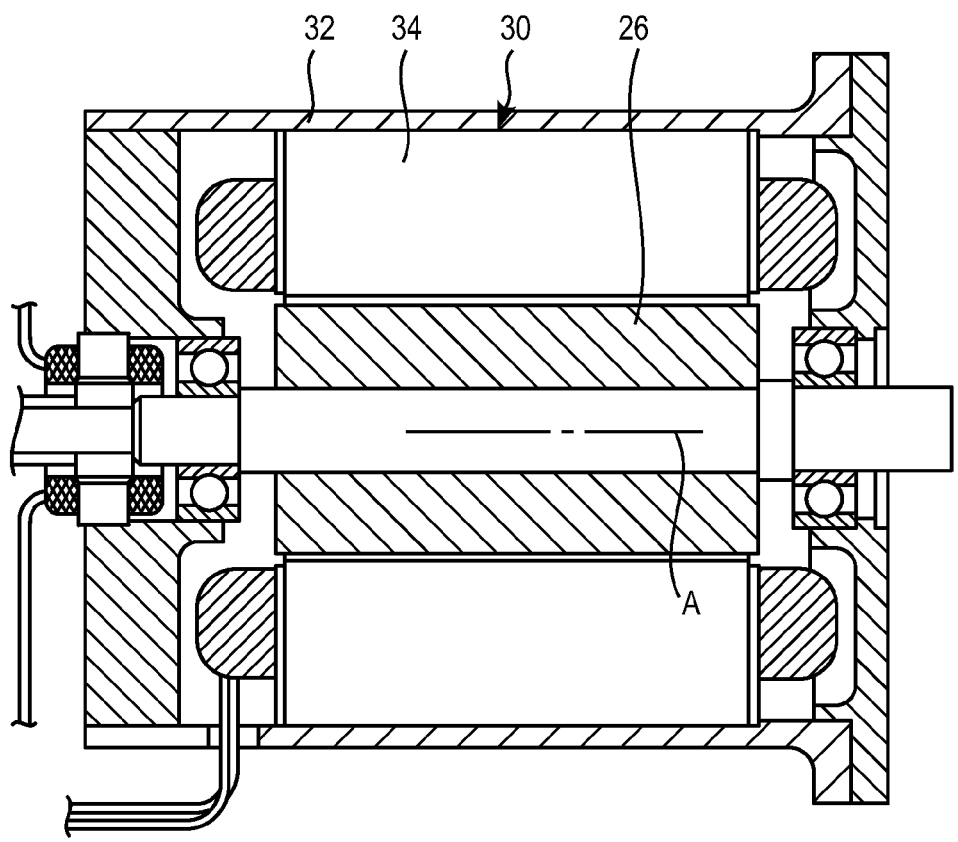
FIG. 3 is a longitudinal sectional view of a prior art permanent magnet electric machine.
Figure 4:
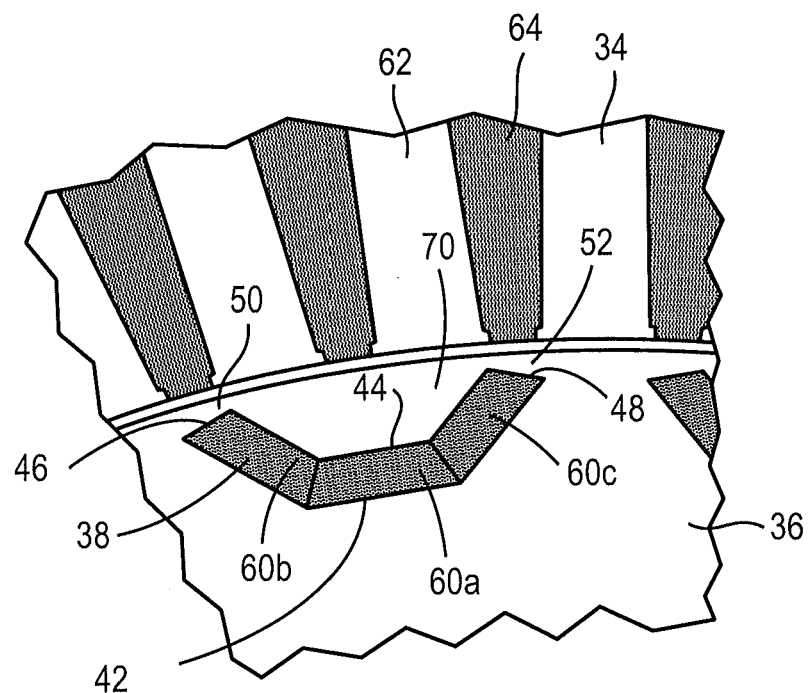
FIG. 4 is a fragmentary view of a first permanent magnet rotor according to the invention, being used in the machine of FIG. 3.

Depicted in FIGS. 3 and 4 is a permanent embedded magnet-type electric machine such as an electric motor 30, comprising a housing 32 in which is disposed a conventional stator 34 surrounding a rotor core 36 that is rotatably mounted in a conventional manner. Formed in the rotor core are magnet insertion holes 38, preferably of a U-shape which is concave with respect to a circumferential surface of the rotor core. Each hole 38 extends in a direction parallel to the rotational axis A of the rotor and having a generally concave cross sectional shape relative to the circumferential surface 40 of the rotor core. Each hole has a radially inward side 42, a radially outward side 44 and two ends 46, 48 that are spaced apart from the circumferential surface 40 by respective bridge regions 50, 52 formed by the rotor core 36. Permanent magnets, i.e., a center magnet 60a and two outer magnets 60b and 60c, are inserted in each of the holes.

The rotor core (and thus the bridge regions) can be formed of various metals, such as silicon steel (SiFe), carbon steel, nickel iron (NiFe) and cobalt iron (CoFe), for example.

The stator includes teeth 62 formed along the inner periphery thereof at a preset angular interval and windings or coils 64 wound around the teeth. The coils may be, for instance, three-phase windings, if a three-phase alternating current is allowed to flow through the coils. The rotor core is caused to rotate by a permanent magnetic field torque due to the interaction between the current flowing through the coils and the magnetic flux of the permanent magnets. Also, each permanent magnet tends to align itself in the minimum reluctance position relative to the magnetic field generated by the current flowing through the coils, thereby generating the reluctance torque that also turns the rotor core with respect to the stator core.

The bridge regions, which retain the magnets against centrifugal force generated during motor operation, can be of various shapes, including a constant width shape or a varying width shape as shown in FIG. 4 and described in U.S. Pat. No. 7,598,645, the disclosure of which is incorporated by reference herein. The cross sections of the magnets shown in FIG. 4 are designed such that one magnet makes tight contact with neighboring permanent magnet(s) in the hole during operation, i.e., one side surface of the center magnet 60a is in contact or would be forced to be in contact with a side surface of the left outer magnet 60b under excitation from centrifugal or radial force during operation. Likewise, the other side surface of the center magnet 60a is in contact or would be forced in contact with a side surface of the right outer magnet 60c under excitation from centrifugal force. The centrifugal force acting on the permanent magnets during operation is then transmitted through the permanent magnets to appropriate ones of the bridge regions 50, 52.

In accordance with the invention, the amount of flux loss through the bridge regions 50, 52, is reduced by treating or manipulating the material of the bridge regions so as to reduce the magnetic permeability thereof, i.e., to increase their magnetic reluctance, whereby the magnetic permeability of the bridge regions is less than that of portions of the rotor core situated adjacent the bridge regions. Such local reluctance enhancement (LRE) results in a number of benefits. First, it increases the saliency of the rotor and therefore increases the reluctance torque produced by the motor. Second, it minimizes flux leakage to other poles within the rotor core, allowing more magnet flux to link the stator, thereby increasing the torque produced by the permanent magnets. Third, it may strengthen the bridge regions which will allow the motor to operate at higher speeds. Those benefits, resulting in additional torque production, will translate to less material needed in the motor to produce the same torque and power. Therefore, less cost will be incurred in motor production.

The localized manipulation of the material properties in the bridge regions 50, 52 may be accomplished in a number of different ways in order to change the grain structure of the bridge regions. For example, the bridge regions can be locally heated to at least the Curie temperature of the rotor core material. (The Curie temperature of SiFe is 1400-1450° and that of CoFe is 1575-1625°). Such heating will change the grain structure of the material and thus reduce, possibly eliminating, the magnetic permeability of the material. It is apparent that this goal is achievable because certain phases of ferrous materials with modified or randomized grain structures have been shown to be almost completely non-magnetic or exhibit high magnetic reluctance close to that of air.

The local heating would preferably be achieved by use of a laser. In laser heat treating, energy is rapidly transmitted to the material in order to effect a metallurgical transformation. Both CO2 and Nd:YAG continuous wave lasers would be suitable for this purpose.

Other techniques for changing the grain structure of the bridge material include, but are not necessarily limited to: quenching or various methods of controlled cooling of the bridge regions, cold working (also called work hardening) by impacting the bridge regions, hot working (deformation of the material at elevated temperatures) of the bridge regions, or combinations of the above techniques.

Due to the resulting increased reluctance in the bridge regions, the magnetic flux leakage from the center pole section 70 to neighboring poles is reduced by decreasing the ability of the bridge regions to conduct flux, thereby making it possible to obtain a higher magnetic flux density in the center pole section 70. Moreover, there is no limit on the thickness with which the bridge regions can be made in order to make them able to resist rotor breakage under the action of centrifugal forces acting on the magnets during operation, thereby enabling rotor speed to be increased. Also, the size of the permanent magnets can be made larger, resulting in an even greater increase in magnetic flux density produced in the center pole section 70. The increased magnetic flux density in the center pole section, combined with the fact that the saliency in the rotor core 36 will be increased, means that the overall torque of the motor can be increased.

In addition, the rotor core 31 requires no retention ring covering the outer peripheral portion of the rotor core as proposed in the prior art. The elimination of such a nonmagnetic retention ring reduces the manufacturing cost, and allows the air gap between the rotor core 36 and stator 34 to be optimized to improve performance. It also improves the performance of machines which rely on magnetic saturation and small bridge regions to minimize flux linkage. Because of local reluctance enhancement in the bridge regions, the bridge regions can be larger, providing for more strength and higher speed. Additionally, for bridge regions of a given size, local reluctance enhancement will provide higher torque. Thus, this invention provides a means for low cost motors with enhanced rotational speeds, power, and torque densities.

As noted above, the increased reluctance in the bridge regions will improve generated torque by increasing the saliency of the rotor and reducing PM magnet flux leakage from the primary path through the stator. The same process that produces the increased reluctance is also expected to increase mechanical strength of the bridge regions. Such increased strength may allow the bridge thickness to be made smaller than would otherwise be the case, further increasing the rotor saliency and reducing the flux leakage.

Figure 5:
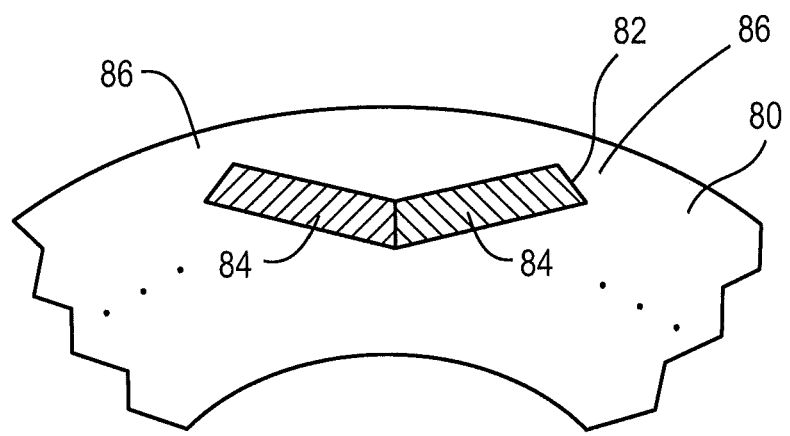
FIG. 5 is a fragmentary view of a second permanent magnet rotor according to the invention.
Figure 6:
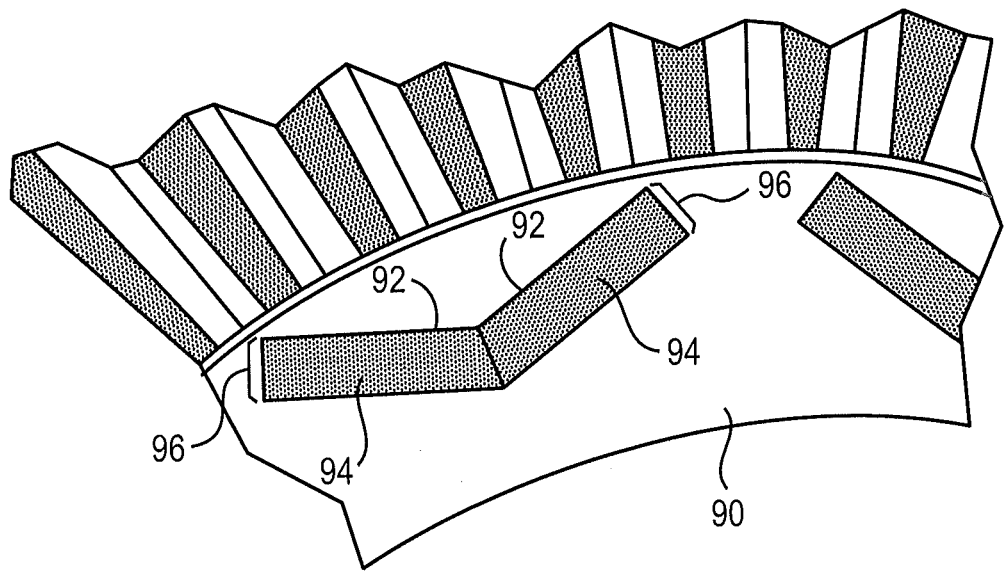
FIG. 6 is a fragmentary view of a third permanent magnet rotor according to the invention.
Figure 7:
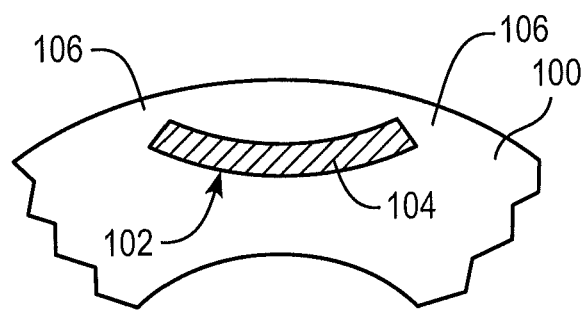
FIG. 7 is a fragmentary view of a fourth permanent magnet rotor according to the invention.
Figure 8:
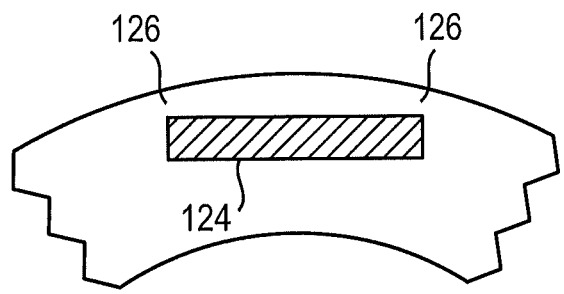
FIG. 8 is a fragmentary view of a fifth permanent magnet rotor according to the invention.
Figure 9:
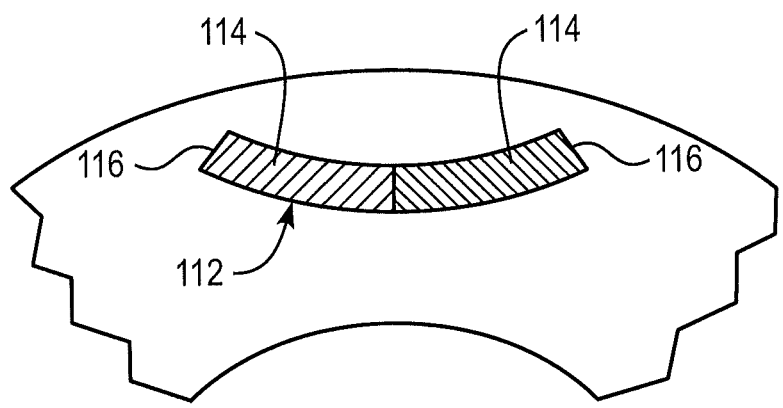
FIG. 9 is a fragmentary view of a sixth permanent magnet rotor according to the invention.

The above-described local reluctance enhancement of the rotor's bridge regions is applicable to a variety of IPM rotor geometry employing bridges, which retain magnets and contain the flux leakage between magnet poles, e.g., as shown in FIGS. 5-8, respectively. In FIG. 5, a rotor core 80 possesses generally concave V-shaped permanent magnet insertion holes 82, two trapezoidal-shaped permanent magnets 84 inserted in the holes, and bridge regions 86. In FIG. 6, a rotor core 90 possesses generally concave V-shaped arrangement of permanent magnet insertion holes 92, two rectangular permanent magnets 94 inserted in the holes, and bridge regions 96. In FIG. 7, a rotor core 100 possesses a generally concave U-shaped permanent magnet insertion hole 102, a correspondingly U-shaped permanent magnet 104 inserted in the hole, and bridge regions 106. In FIG. 9, a generally concave U-shaped permanent magnet insertion hole 112 receives, two curve-shaped permanent magnets 114, and bridge regions 116.

The localized treatment or manipulation of the material properties in the bridge regions 86, 96, 106 and 116 of FIGS. 5-8 may be accomplished using one or more of the techniques described above.

Figure 1:
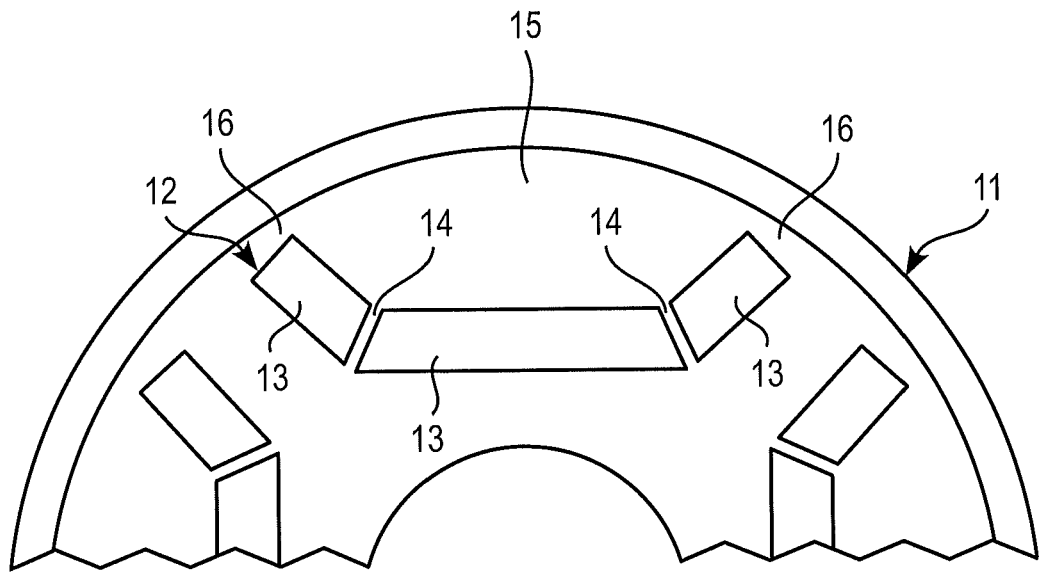
FIG. 1 is a fragmentary view of a first prior art permanent magnet rotor.
Figure 2:
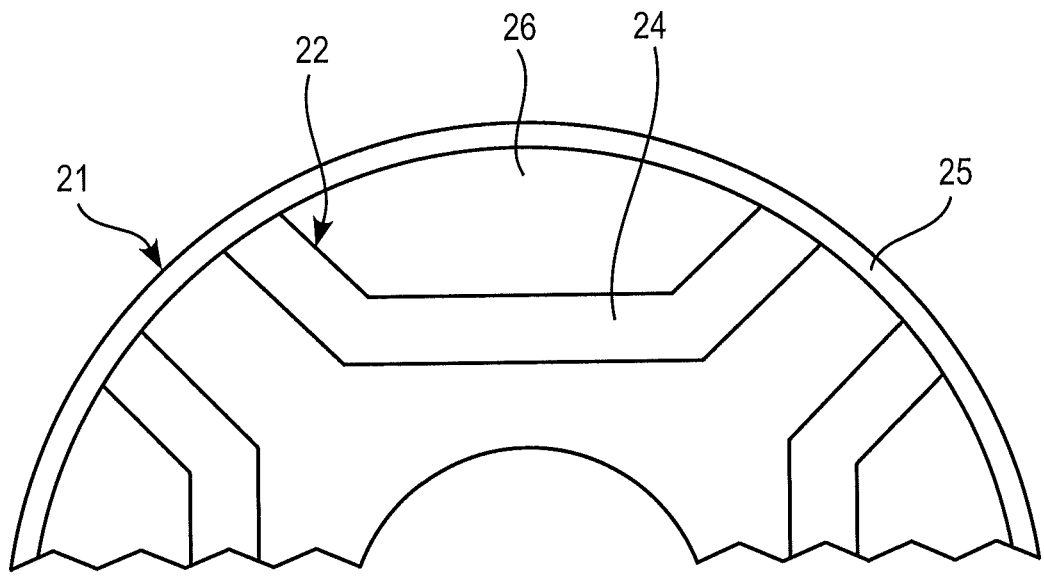
FIG. 2 is a fragmentary view of a second prior art permanent magnet rotor.

It is also possible to employ a rotor wherein each hole arrangement comprises multiple holes separated from one another by ribs, as shown in FIG. 1, wherein the ribs 14 and the bridge regions 16 are metalurgically transformed to reduce the magnetic permeability thereof.

It should be apparent to those of ordinary skill in the art that the rotor core may have any suitable numbers of magnet-receiving holes, and can be used in any suitable type of permanent magnet motor.

While the invention has been described in detail with reference to specific embodiments thereof, it will be apparent to those skilled in the art that various changes and modifications can be made, and equivalents employed, without departing from the scope of the appended claims.

The magnet need not be curved. It could be a flat magnet 124 as shown in FIG. 8, which forms bridge regions 126.

What is claimed is:

1. A permanent magnet rotor, comprising:
   a rotor core having a generally cylindrical shape with an outer circumferential surface and a rotational axis, the rotor core being entirely formed of a magnetic material; and
   a plurality of permanent magnets formed in the rotor core and arranged circumferentially at preset angular intervals about the circumferential surface, each of the permanent magnets extending in a direction parallel to the rotational axis and having a center portion, a radially inward side, a radially outward side, and two outer ends that are respectively spaced apart from the circumferential surface by respective bridge regions formed in the rotor core;
   wherein the outer ends are arranged closer to the circumferential surface than the center portion, and each of the permanent magnets defines a respective intermediate portion in the rotor core that is bounded by the radially outward side of the permanent magnet, the bridge regions at each of the outer ends, and the circumferential surface of the rotor core, such that the intermediate portions are isolated from a remainder of the rotor core by their respective permanent magnets and the respective bridge regions;
   wherein the material of the bridge regions is metallurgically transformed to possess greater magnetic reluctance than the material of the intermediate portions of the rotor core to reduce magnetic flux leakage from the intermediate portions through the bridge regions and cause the intermediate portions to have an increased magnetic flux density relative to a magnetic flux density of the bridge regions.

2. The rotor according to claim 1, further comprising:
   a plurality of magnet insertion hole arrangements formed in the rotor core.

3. The rotor according to claim 2, wherein each hole arrangement comprises a single hole, and
   at least one of the permanent magnets is situated in each hole.

4. The rotor according to claim 3, wherein a plurality of the permanent magnets is situated in each hole.

5. The rotor according to claim 2, wherein each hole arrangement is of generally concave cross-sectional shape relative to the circumferential surface.

6. The rotor according to claim 2, wherein each hole arrangement is flat.

7. The rotor according to claim 1, wherein the material of the bridge regions is metallurgically transformed by localized application of at least one of heat, quenching, controlled cooling and deformation to the material of the bridge regions by an energy source external to the permanent magnet motor to change the grain structure of the material of the bridge regions relative to the material of the remainder of the rotor core.

8. A method of making a permanent magnet rotor, comprising the steps of:
   providing a rotor core having a generally cylindrical shape with an outer circumferential surface and a rotational axis, the rotor core being entirely formed of a magnetic material;
   providing a plurality of permanent magnets formed in the rotor core and arranged circumferentially at preset angular intervals about the circumferential surface, each of the permanent magnets extending in a direction parallel to the rotational axis and having a center portion, a radially inward side, a radially outward side, and two ends that are respectively spaced apart from the circumferential surface by respective bridge regions formed in the rotor core, the outer ends being arranged closer to the circumferential surface than the center portion, and each of the permanent magnets defining a respective intermediate portion in the rotor core that is bounded by the radially outward side of the permanent magnet, the bridge regions at each of the outer ends, and the circumferential surface of the rotor core, such that the intermediate portions are isolated from a remainder of the rotor core by their respective permanent magnets and the respective bridge regions; and metallurgically transforming the material of the bridge regions to endow such material with greater magnetic reluctance than the material of the intermediate portions of the rotor core to reduce magnetic flux leakage from the intermediate portions through the bridge regions and cause the intermediate portions to have an increased magnetic flux density relative to a magnetic flux density of the bridge regions.

9. The method according to claim 8, wherein the metallurgical transforming step comprises changing the grain structure of the material of the bridge regions.

10. The method according to claim 9, wherein the metallurgical transforming step comprises subjecting the material of the bridge regions to heat treatment.

11. The method according to claim 10, wherein the heat treatment comprises heating the material of the bridge regions to at least the Curie temperature of the material.

12. The method according to claim 11, wherein the heating is performed by laser-heating.

13. The method according to claim 8, wherein the metallurgical transforming step comprises cold working the material of the bridge regions.

14. The method according to claim 8, wherein the material of the bridge regions is metallurgically transformed by localized application of at least one of heat, quenching, controlled cooling and deformation to the material of the bridge regions by energy source external to the permanent magnet motor to change the grain structure of the material of the bridge regions relative to the material of the remainder of the rotor core.

15. A permanent magnet electric machine, comprising:
a stator;
a rotor core mounted in the stator and having a generally cylindrical shape with an outer circumferential surface and a rotational axis, the rotor core being entirely formed of a magnetic material;
a plurality of permanent magnets formed in the rotor core and arranged circumferentially at preset angular intervals about the circumferential surface, each of the permanent magnets extending in a direction parallel to the rotational axis and having a center portion, a radially inward side, a radially outward side, and two outer ends that are respectively spaced apart from the circumferential surface by respective bridge regions formed in the rotor core; and wherein the outer ends are arranged closer to the circumferential surface than the center portion, and each of the permanent magnets defines a respective intermediate portion in the rotor core that is bounded by the radially outward side of the permanent magnet, the bridge regions at each of the outer ends, and the circumferential surface of the rotor core, such that the intermediate portions are isolated from a remainder of the rotor core by their respective permanent magnets and the respective bridge regions;

wherein the material of the bridge regions is metallurgically transformed to possess greater magnetic reluctance than the material of the intermediate portions of the rotor core by to reduce magnetic flux leakage from the intermediate portions through the bridge regions and cause the intermediate portions to have an increased magnetic flux density relative to a magnetic flux density of the bridge regions.

16. The machine according to claim 15, wherein the material of the bridge regions is metallurgically transformed by localized application of at least one of heat, quenching, controlled cooling and deformation to the material of the bridge regions by an energy source external to the permanent magnet electric machine to change the grain structure of the material of the bridge regions relative to the material of the remainder of the rotor core.

17. The machine according to claim 15, further comprising:
a plurality of magnet insertion hole arrangements formed in the rotor core.

18. The machine according to claim 17, wherein each hole arrangement comprises a single hole, and
at least one of the permanent magnets is situated in each hole.

19. The machine according to claim 18, wherein a plurality of the permanent magnets is situated in each hole.

20. The machine according to claim 17, wherein each hole arrangement is of generally concave cross-sectional shape relative to the circumferential surface.

21. The machine according to claim 17, wherein each hole arrangement is flat.

22. The machine according to claim 15, wherein the machine comprises an electric motor.

23. The machine according to claim 15, wherein the machine comprises an electric generator.

* * * * *